United States Patent [19]

Echt et al.

[11] Patent Number: 4,579,667

[45] Date of Patent: Apr. 1, 1986

[54] GELLED AQUEOUS COMPOSITIONS

[75] Inventors: Elliott Echt, New Castle County, Del.; Ronald D. Lees, Richmond, Va.

[73] Assignee: Hercules Incorporated, Wilmington, Del.

[21] Appl. No.: 669,485

[22] Filed: Nov. 7, 1984

[51] Int. Cl.$^4$ ............................................. E21B 43/26
[52] U.S. Cl. ............................... 252/8.55 R; 166/274; 166/308; 252/8.55 D; 523/130; 523/411; 523/414; 523/418
[58] Field of Search ............... 523/411, 414, 418, 130; 252/8.55 R, 8.55 D; 166/308

[56] References Cited

U.S. PATENT DOCUMENTS 3,224,986  9/1965  Butler .................................. 106/131
3,272,640  9/1966  Geurden ............................. 106/131
3,909,423  9/1975  Hessert et al. ..................... 252/8.55
4,043,921  8/1977  Hessert et al. ................. 252/8.55 X
4,055,502  10/1977  Swanson .......................... 252/8.55
4,409,110  10/1983  Borchardt et al. ................ 252/8.55

*Primary Examiner*—Herbert B. Guynn
*Attorney, Agent, or Firm*—Joanne L. Horn

[57] ABSTRACT

Disclosed are gelled aqueous compositions in brine solutions having a salt concentration from about 1% to about 10% at a pH of about 3 to about 11 having (a) a water thickening amount of an anionic partially hydrolyzed polyacrylamide and (b) a water-soluble cationic polyamide-epichlorohydrin resin in an amount sufficient to cause gelation and form the gelled composition. The compositions are useful in the recovery of oil and gas by fracturing and in enhanced oil recovery.

8 Claims, No Drawings

GELLED AQUEOUS COMPOSITIONS

This invention relates to gelled aqueous compositions comprising an anionic partially hydrolyzed acrylamide and a water-soluble cationic polyamide-epihalohydrin resin useful in the recovery of oil and gas by fracturing and in enhanced oil recovery.

Oil and gas are generally found in porous or permeable subterranean formations. Once penetrated, oil and gas contained in the pore spaces are displaced into the wellbore by a variety of known methods. However, the production of the oil and gas may be impaired due to the plugging of the channels through which the oil and gas must flow to the wellbore by drilling fluids or as a result of insufficient flow channels to carry the oil and gas to the wellbore. Such well formations are said to have low permeability.

An established method used today to stimulate the production of oil from a well having low permeability is fracturing with a hydraulic fracturing fluid. This technique comprises the injection of a suitable fracturing fluid into the formation under sufficient pressure to fracture the formation. The resulting fracture provides passageways to facilitate the flow of the oil and gas into the wellbore. The principal ingredients of current fracturing fluids are water-soluble polymers and polyvalent metal salts and metal complexes of organic compounds. See, for example, U.S. Pat. Nos. 3,785,437 and 3,921,733. The polyvalent metal ion crosslinks the water-soluble polymer to form a crosslinked polymer gel. This invention eliminates the need to use polyvalent metal salts and complexes.

Typically, propping agents are included in the fracturing fluid to maintain the fracture in a propped condition when the pressure is relieved. The crosslinked polymer gel suspends the sand, walnut shell fragments, glass beads, aluminum pellets, or other propping agents as the fluid moves into the fracture. Usually propping agents have particle sizes from about 8-40 mesh (U.S. Sieve).

During the injection of fluid into the well formation, the fracturing fluid must have and must maintain the properties necessary to give fractures of reasonable lengths and widths. This is referred to as the fluid efficiency of the fracturing fluid. Such properties are related to the fluid loss characteristics and the viscosity of the particular fluid used. One way to minimize the loss of water to the walls of the wellbore and the fracture is to increase the viscosity of the fracturing fluid.

The use of gelled polymer solutions to improve the fracturing fluid efficiency has been taught. See, for example, U.S. Pat. No. 4,018,286. Further, the use of blends of polymers to increase the solution viscosities has been reported. U.S. Pat. No. 4,043,721, for example, teaches the use of blends of cellulose ethers and polyacrylamides to produce a matrix plugging gel having improved gel strength.

The gelled compositions of this invention can also be used as plugging agents in enhanced oil recover. For example, the gelled compositions can be placed in high permeability zones in the formation so that subsequent treatment is forced into the low permeability zones, thereby giving better sweep efficiency by increasing the contact with, and removal of, oil. The compositions of this invention can also be useful for mobility control in post-primary oil recovery operations a "pusher" materials. For example, in surfactant flooding, the compositions can be injected as slugs to push previously injected surfactant slugs to recover oil at a producing well.

The length of time which a polymer gel can maintain its integrity depends on the depth of the well and on the thermal stability of the gel at that depth. The temperature of the well formation varies as a function of depth. The deeper the well, the higher the temperature at the bottom of the well. For example, the typical temperature range of the bottom of a well 2,000 feet deep is 89°–91° F., whereas a well 10,000 feet deep generally has a bottom hole temperature range of 141°–200° F., and a well 18,000 feet deep a bottom hole temperature range of 199°–385° F. At the present time, most wells drilled are under 10,000 feet in depth.

The thermal stability of a polymer gel depends on the strength of the crosslinking bonds and on the stability of the polymer backbone to degradation.

This invention provides gelled aqueous compositions in brine solutions having a salt concentration of from about 1% to about 10% at a pH of from about 3 to about 11 having (a) a water thickening amount of an anionic partially hydrolyzed polyacrylamide and (b) a water-soluble cationic polyamide-epihalohydrin resin in an amount sufficient to cause gelation and form the gelled composition. Gel formation is believed to result from the electrostatic interaction of the cationic polyamide-epihalohydrin resin and the anionic partially hydrolyzed polyacrylamide useful in this invention.

Suitable anionic polyacrylamides include any partially hydrolyzed homopolymer of acrylamide, homopolymer of methacrylamide, and copolymer of acrylamide or methacrylamide with other water-soluble vinyl addition monomers containing an anionic charge or capable of generating an anionic charge. Suitable monomers include maleic anhydride and unsaturated carboxylic acids, such as acrylic acid, methacrylic acid, maleic acid, crotonic acid, itaconic acid, and their alkali metal salts. Other monomers, such as acrylonitrile and alkyl esters of acrylic acid or methacrylic acid, can also be employed provided the resulting copolymers with acrylamide can be hydrolyzed to form anionic carboxylate groups. The mole ratio of acrylamide to comonomers is from about 99:1 to about 0:100, preferably from about 95:5 to about 5:95. The preferred anionic polyacrylamides are copolymers of acrylamide with sodium acrylate containing about 5 to about 95 mole % sodium acrylate and polyacrylamides treated with an alkali metal hydroxide, preferably sodium hydroxide to hydrolyze about 5 to about 95 mole % amide groups to carboxylate groups. Molecular weights can range from 100,000 to 10 million or more, preferably 2–10 million or more. The most preferred anionic polyacrylamides are copolymers of acrylamide with sodium acrylate containing about 10 to about 70 mole % sodium acrylate and polyacrylamides treated with an alkali metal hydroxide, preferably sodium hydroxide to hydrolyze about 10 to about 70 mole % amide groups to carboxylate groups. The polymers can be prepared by any method practiced in the art. Thus, polymerization can be conducted with chemical initiators, such as redox initiators; with thermally-active initiators, such as persulfates, peroxides and azo compounds; with ionizing irradiation, such as ultraviolet light, X-ray, gamma ray, or electron beam. Typical polymerization methods employed include solution polymerization, precipitation polymerization, water-in-oil emulsion polymerization, and water-in-oil suspension polymerization.

Suitable alkali metals include sodium and potassium. Sodium is the preferred alkali metal.

The amount of anionic polyacrylamide used in the practice of this invention can vary depending on the viscosity and purity of the polymer. In general, a water thickening amount, i.e. that amount which will significantly thicken the water to which it is added, is used. Typically, this amount is from about 0.1% to about 1.0%, preferably 0.1% to about 0.6%.

The polyamide-epichlorohydrin resins are generally prepared by the reaction of a dicarboxylic acid with a polyalkylene polyamine to form a water-soluble, long-chain polyamide containing

recurring units, where n and x are each 2 or more, preferably 2 to 4, and R is the divalent organic radical of the dicarboxylic acid. This long-chain polyamide is then reacted with epichlorohydrin to form a water-soluble cationic thermosetting resin.

Typical dicarboxylic acids include saturated aliphatic dicarboxylic acids preferably containing 3-8 carbon atoms, such as malonic, succinic, glutaric, adipic, azelaic, and sebacic acid, or blends of 2 or more. Suitable polyalkylene polyamines contain two primary amine groups and at least one secondary amine group and include polyethylene polyamines, polypropylene polyamines, and polybutylene polyamines. Typical polyamines include diethylenetriamine, triethylenetetramine, tetraethylenepentamine, propylenediamine, hexamethylenediamine, and piperazine, or mixtures thereof. The mole ratios of polyalkylene polyamine to dicarboxylic acid are from about 0.9:1 to about 1.2:1. The aqueous polyamide formed above is converted to a cationic thermosetting resin by reaction with epichlorohydrin at 45°–100° C. until the viscosity of a 25% solids solution at 25° C. has reached at least B, and preferably at least D, on the Gardner-Holt scale. It is preferred that all secondary amine groups be converted to tertiary and/or quaternary ammonium groups. Thus, it is preferred to utilize from about 0.9 mole to about 1.5 mole of epichlorohydrin per mole of secondary amine group.

Polyamide-epihalohydrin resins are prepared in aqueous solution at a pH of from about 7 to about 9.5 and has a tendency to gel on standing. The resin solution is stabilized against gelation by adding to the aqueous solution thereof sufficient acid, such as hydrochloric acid, to obtain and maintain the pH at about 2. Such resins are referred to in the art as acid-stabilized resins, and are usually marketed in this form.

In forming the crosslinked gel, the anionic polyacrylamide is generally used at concentrations of about 500 ppm to about 10,000 ppm polymer solids, based on the total weight of the composition. Preferably about 1,000 ppm to about 6,000 ppm polymer solids is used. Expressed as a percent, this is usually from about 0.05% to about 1.0% polymer solids, by weight of the total composition, preferably 0.1% to about 0.6%.

The polyamide-epichlorohydrin resin is generally used at concentrations of about 100 ppm to about 5,000 ppm resin solids, preferably about 500 ppm to about 2,500 ppm. As a percent, this is from about 0.01% to about 0.5% resin solids, preferably about 0.05% to about 0.25%.

Exact amounts of each will depend on the molecular weight and mole % anionic groups in the anionic polyacrylamide, ionic strength, temperature, pH, and the strength of gel desired.

Some mineral salts must be present in the aqueous solution, since a precipitate will form between the anionic polyacrylamide and the cationic polyamide-epichlorohydrin resin in the absence of salts or ionic strength. Typically, the salt concentration is from about 1% to about 10%, preferably 1% to about 6%, most preferably 1% to about 4%. Any water-soluble salt may be employed, but generally salts of alkali metals are preferred, such as NaCl, KCl, KBr, $Na_2SO_4$ and $NaNO_3$. KCl is preferred. Generally there is an optimum amount of salt that will provide the best gel strength for a given anionic polyacrylamide. For example, for anionic polyacrylamides containing about 7 to about 8 mole % sodium acrylate groups, about 1 wt. % KCl is best for anionic polyacrylamides containing about 24 mole % sodium acrylate groups, about 2 wt. % KCl is best, and for anionic polyacrylamides containing about 50 mole % sodium acrylate groups about 2 to about 4 wt. % KCl is best. As the mole % of sodium acrylate or more % carboxylate groups to amide groups increases, the optimum salt concentration increases.

The pH of the solution can be from 3-11, most preferably from 5-9. Often a pH near 7 gives the best gel strength. Oilfield brines containing mineral salts with greater than 1,000 ppm solids content (0.1%) may be employed, although sea water and hard brines containing 1,000 ppm (0.1%) or more divalent cations, such as $Ca^{++}$, and having a total dissolved solids (TDS) above 30,000 ppm (3.0.), are unsatisfactory.

Gels are formed at about 75° F. (25° C.) to about 185° F. (85° C.) or higher. The temperature can govern the rate of gel formation, the maximum gel strength, and the rate of gel decay. Thus, it is often necessary to vary the anionic polyacrylamide and cationic polyamide resin concentrations, the type and amount of salt, and the pH to obtain the rate of gel formation and gel strength desired for a particular oil reservoir at a given temperature.

The compositions of this invention can be prepared for use as fracturing fluids at the surface in a suitable tank equipped with a suitable mixing means, and pumped down the wellbore into the formation using conventional equipment for such compositions. The compositions can also be prepared "on the fly", i.e. while being pumped down the well. In this case the anionic polyacrylamide solution containing the proppant is prepared in a tank near the well head and pumping of the solution into the wellbore through a conduit is commenced. The solution of the cationic resin in its active form is prepared in a separate tank and is introduced into the aqueous solution stream of the anionic polyacrylamide containing the proppant by a suitable connection a few feet downstream from the anionic polyacrylamide mixing tank. The rate at which the components are introduced into the conduit will depend on the pumping rate of the particular composition of this invention and will be within the skill of those skilled in the art. Alternative methods for combining such fracturing fluid ingredients will also be known to those skilled in the art.

The compositions of this invention can also be mixed in solution at the surface to form dilute gels which are readily pumpable. The heat of the wellbore, particularly at the bottom of the wellbore, will activate the crosslinking reaction. For shallow fracturing, the composition or the separate polymer and resin solutions can be heated before pumping.

The following examples are illustrative of this invention. All parts and percentages used in this specification are by weight unless otherwise specified.

EXAMPLE 1

This example illustrates an embodiment of the gelled aqueous composition of this invention and how to prepare it.

A mixing vessel equipped with a stirrer is charged with 1.2 g of an acrylamide-sodium acrylate copolymer, having a sodium acrylate content of 24 mole %, in 198.8 g of water. Stirring is continued until the polymer is completely dissolved to give a 6,000 ppm polymer solids solution.

An acid-stabilized solution of the (diethylenetriamine-adipic acid) polyamide-epichlorohydrin resin is diluted in a separate container to give a 5% active resin solids solution.

Another mixing vessel is charged with 41.66 g of the 6,000 ppm polymer solids solution, 51 g of water and 1.0 g KCl and hand stirred until the ingredients are dissolved and a homogeneous mixture is obtained. Five (5.0) g of the 5% cationic resin solids solution is added and hand stirred until a homogeneous mixture is obtained. The pH is adjusted to pH 7.0 with 10% NaOH and 10% $H_2SO_4$. Additional water is then added to give exactly 100.0 g total solution containing 2500 ppm of the acrylamide-sodium acrylate copolymer and 2500 ppm of the (diethylenetriamine-adipic acid) polyamide-epichlorohydrin resin. The solution is then stored at a temperature of 104° F. (40° C.). A medium gel is formed in one day and a medium-heavy gel in 2 days. The gel is still medium-heavy after 3 days.

EXAMPLES 2–38

Theses examples illustrate other embodiments of the gelled aqueous compositions of this invention.

The procedure and formulation of Example 1 are used to prepare the compositions except that the formulation is changed as set forth in Table I below.

TABLE I

| Examples | Polyacrylamide | Poly-acrylamide, ppm[1] | Cationic Resin, ppm[2] | KCl, % | pH | Temp, °F. | Gel Ranking[3] Days 1 | 2 | 3 |
|---|---|---|---|---|---|---|---|---|---|
| 2 | Sodium acrylate- | 2500 | 500 | 1 | 3 | 104 | 0 | 0 | 0 |
| 3 | acrylamide copolymer | 2500 | 500 | 1 | 5 | 104 | 1 | 2 | 3 |
| 4 | having 24 mole % | 2500 | 500 | 1 | 7 | 104 | 1 | 4 | 4 |
| 5 | acrylate content | 2500 | 500 | 1 | 9 | 104 | 1 | 5 | 5 |
| 6 |  | 2500 | 500 | 1 | 11 | 104 | 0 | 0 | 0 |
| 7 |  | 2500 | 1000 | 0 | 7 | 104 | 0 | 0 | 0 |
| 8 |  | 2500 | 1000 | 2 | 7 | 104 | 1 | 5 | 5 |
| 9 |  | 2500 | 2500 | 2 | 7 | 104 | 5 | 5 | 5 |
| 10 |  | 2500 | 2500 | 4 | 7 | 104 | 0 | 0 | 1 |
| 11 | Sodium acrylate- | 2500 | 250 | 1 | 7 | 104 | 0 | 0 | 0 |
| 12 | acrylamide copolymer | 2500 | 500 | 1 | 7 | 104 | 0 | 2 | 3 |
| 13 | having 7.7 mole % | 2500 | 1000 | 1 | 7 | 104 | 3 | 3 | 4 |
| 14 | acrylate content | 2500 | 500 | 1 | 5 | 104 | 1 | 1 | 1 |
| 15 |  | 2500 | 500 | 1 | 7 | 104 | 2 | 2 | 3 |
| 16 |  | 2500 | 500 | 1 | 9 | 104 | 1 | 1 | 1 |
| 17 |  | 2500 | 500 | 0 | 7 | 104 | 0 | 0 | 0 |
| 18 |  | 2500 | 500 | 1 | 7 | 104 | 2 | 2 | 3 |
| 19 |  | 2500 | 500 | 2 | 7 | 104 | 0 | 0 | 1 |
| 20 |  | 2500 | 500 | 4 | 7 | 104 | 0 | 0 | 0 |
| 21 |  | 2500 | 500 | 1 | 7 | 185 | 4 | 4 | 2 |
| 22 |  | 2500 | 1000 | 1 | 7 | 185 | 4 | 4 | 2 |
| 23 | Sodium acrylate- | 2500 | 500 | 2 | 7 | 185 | 3 | 3 | 1 |
| 24 | acrylamide copolymer having 24 mole % acrylate content | 2500 | 1000 | 2 | 7 | 185 | 4 | 5 | 3 |
| 25 | Sodium acrylate- | 2500 | 2500 | 0 | 7 | 104 | 0 | 0 | 0 |
| 26 | acrylamide copolymer | 2500 | 2500 | 1 | 7 | 104 | 2 | 4 | 5 |
| 27 | having 53 mole % | 2500 | 2500 | 2 | 7 | 104 | 5 | 5 | 5 |
| 28 | acrylate content | 2500 | 2500 | 3 | 7 | 104 | 2 | 5 | 5 |
| 29 |  | 2500 | 2500 | 4 | 7 | 104 | 3 | 5 | 5 |
| 30 |  | 2500 | 2500 | 6 | 7 | 104 | 0 | 1 | 3 |
| 31 | Sodium acrylate- | 2500 | 2500 | 0 | 7 | 104 | 0 | 0 | 0 |
| 32 | acrylamide copolymer | 2500 | 2500 | 1 | 7 | 104 | 5 | 5 | 5 |
| 33 | having 93 mole % | 2500 | 2500 | 2 | 7 | 104 | 4 | 5 | 5 |
| 34 | acrylate content | 2500 | 2500 | 3 | 7 | 104 | 5 | 5 | 5 |
| 35 |  | 2500 | 2500 | 4 | 7 | 104 | 2 | 4 | 5 |
| 36 |  | 2500 | 2500 | 6 | 7 | 104 | 0 | 0 | 2 |
| 37 |  | 2500 | 2500 | 8 | 7 | 104 | 0 | 0 | 3 |
| 38 |  | 2500 | 2500 | 10 | 7 | 104 | 0 | 0 | 1 |

[1] Ppm polymer solids, based on the total solution.
[2] Ppm resin solids, based on the total solution.
[3] 0 = Fluid, no gel.
1 = Light gel, flows but has some body.
2 = Light-medium gels, flows but more gel-like.
3 = Medium gel, can be poured but definitely a gel.
4 = Medium-heavy gel, flows slowly.
5 = Heavy gel, flows very slowly or not at all.

EXAMPLES 39–44

Theses examples illustrate other embodiments of the gelled aqueous compositions of this invention.

The procedure and formulation of Example 1 are used to prepare the compositions except that the formulation is changed as set forth in Table II below.

The compositions were tested under near optimum conditions, i.e., at pH 7 and at a salt concentration of from about 1% to about 2%.

polyamide-epichlorohydrin resin, and 1.5% KCl at pH 7 is 350° F. ($T_B$) and 120 dynes/cm² ($G'$).

Thus, this invention provides aqueous gelled compo-

TABLE II

| Examples | Polyacrylamide | Poly-acrylamide, ppm[1] | Cationic Resin, ppm[2] | KCl, % | pH | Temp, °F. | Gel Ranking[3] Hours | | | | | |
|---|---|---|---|---|---|---|---|---|---|---|---|---|
| | | | | | | | 2 | 4 | 6 | 24 | 48 | 120 |
| 39 | Sodium acrylate- | 2500 | 500 | 1 | 7 | 104 | 0 | 0 | 0 | 2 | 3 | 4 |
| 40 | acrylamide copolymer | 2500 | 1000 | 1 | 7 | 104 | 0 | 0 | 0 | 2 | 5 | 5 |
| 41 | having 24 mole % | 2500 | 1000 | 2 | 7 | 104 | 0 | 1 | 1 | 3 | 5 | 5 |
| 42 | acrylate content | 2500 | 500 | 1 | 7 | 185 | 1 | 3 | 4 | 5 | 2 | 0 |
| 43 | Sodium acrylate- | 2500 | 1000 | 1 | 7 | 104 | 0 | 1 | 1 | 3 | 4 | 4 |
| 44 | acrylamide copolymer having 7.7 mole % acrylate content | 5000 | 1000 | 1 | 7 | 104 | 0 | 0 | 0 | 3 | 5 | 5 |

[1]Ppm polymer solids, based on the total solution.
[2]Ppm resin solids, based on the total solution.
[3]0 = Fluid, no gel.
1 = Light gel, flows but has some body.
2 = Light-medium gels, flows but more gel-like.
3 = Medium gel, can be poured but definitely a gel.
4 = Medium-heavy gel, flows slowly.
5 = Heavy gel, flows very slowly or not at all.

EXAMPLES 45-53

Theses examples illustrate other embodiments of the gelled aqueous compositions of this invention.

The procedure and formulation of Example 1 are used to prepare the compositions except that the formulation is changed as set forth in Table III below.

The compositions were tested under near optimum conditions at high polyacrylamide concentrations and at varying polyamide-epichlorohydrin resin concentrations.

sitions having high temperature stability useful in fracturing fluids for the recovery of oil and gas from well formations. The gels are also useful as plugging agents in enhanced oil recovery and in other gas and oil recovery operations.

Features, advantages and other specific embodiments of this invention will become readily apparent to those exercising ordinary skill in the art after reading the foregoing disclosures. In this regard, while specific embodiments of this invention have been described in considerable detail, variations and modifications of

TABLE III

| Examples | Polyacrylamide | Poly-acrylamide, ppm[1] | Cationic Resin, ppm[2] | KCl, % | pH | Temp, °F. | Gel Ranking[3] Hours | | | | | | |
|---|---|---|---|---|---|---|---|---|---|---|---|---|---|
| | | | | | | | 2 | 4 | 6 | 24 | 48 | 96 | 168 |
| 45 | Sodium acrylate- | 5600 | 750 | 1.5 | 7 | 77 | 0 | 0 | 0 | 1 | 1 | 1 | 1 |
| 46 | acrylamide copolymer | 5600 | 750 | 1.5 | 7 | 122 | 0 | 0 | 2 | 5 | 5 | 5 | 5 |
| 47 | having 24 mole % | 5600 | 750 | 1.5 | 7 | 176 | 5 | 5 | 5 | 5 | 5 | 1 | 1 |
| 48 | acrylate content | 5600 | 1250 | 1.5 | 7 | 77 | 0 | 0 | 2 | 2 | 2 | 4 | 4 |
| 49 | | 5600 | 1250 | 1.5 | 7 | 122 | 0 | 4 | 4 | 5 | 5 | 5 | 5 |
| 50 | | 5600 | 1250 | 1.5 | 7 | 176 | 5 | 5 | 5 | 5 | 5 | 2 | 1 |
| 51 | | 5600 | 2500 | 1.5 | 7 | 77 | 2 | 2 | 3 | 4 | 4 | 4 | 4 |
| 52 | | 5600 | 2500 | 1.5 | 7 | 122 | 4 | 5 | 5 | 5 | 5 | 5 | 5 |
| 53 | | 5600 | 2500 | 1.5 | 7 | 176 | 5 | 5 | 5 | 5 | 4 | 1 | |

[1]Ppm polymer solids, based on the total solution.
[2]Ppm resin solids, based on the total solution.
[3]0 = Fluid, no gel.
1 = Light gel, flows but has some body.
2 = Light-medium gels, flows but more gel-like.
3 = Medium gel, can be poured but definitely a gel.
4 = Medium-heavy gel, flows slowly.
5 = Heavy gel, flows very slowly or not at all.

The test results in Table III show that gels develop at room temperature (77° F.) at high anionic polyacrylamide concentrations. Further, the test shows the buildup in gel strength that occurs in the presence of cationic polyamide-epichlorohydrin resins.

The aqueous gelled compositions have good thermal stability as indicated by their high thermal breakdown temperatures, $T_B$, and by their storage modulus, $G'$. $G'$ is a measure of gel strength. A strong gel has a storage modulus of about 100 dynes/cm². A weak gel has a storage modulus of about 10 dynes/cm². For example, the $T_B$ and $G'$, as measured by a Rheometrics pressure rheometer, for the gel of Example 54 formed with 5600 ppm acrylamide-sodium acrylate (24 mole % sodium acrylate), 2500 ppm (diethylene triamine-adipic acid)

these embodiments can be effected without departing from the spirit and scope of the invention as disclosed and claimed.

What we claim and desire to receive by Letters Patent is:

1. A gelled aqueous brine composition having a salt concentration from about 1% to about 10% and a pH of from about 3 to about 11 comprising:
   (a) a water thickening amount of an anionic partially hydrolyzed polyacrylamide or an anionic copolymer of acrylamide and sodium acrylate having a molecular weight of at least 100,000, and
   (b) a water-soluble cationic (polyalkylene polyamine-$C_{3-8}$dicarboxylic acid) polyamide-epichlorohydrin resin, said polyamide having been prepared by reacting a mole ratio of polyalkylene polyamine:

dicarboxylic acid of from about 0.9:1 to about 1.2:1, said resin being present in an amount sufficient to cause a gel to form.

2. The composition of claim 1 wherein (b) has about 0.9 mole to about 1.5 mole epichlorohydrin per mole of secondary amine group.

3. The composition of claim 1 wherein the brine solution has a salt concentration of from about 1% to about 6%.

4. The composition of claim 1 wherein (a) is present in an amount from about 0.05% to about 1.0% polymer solids.

5. The composition of claim 1 wherein (b) is present in an amount from about 0.01% to about 0.50% resin solids.

6. The composition of claim 1 wherein the polyalkylene polyamine is diethylene triamine and the dicarboxylic acid is adipic acid.

7. The composition of claim 1 wherein (a) is a copolymer of acrylamide and sodium acrylate having from about 5 to about 95 mole % sodium acrylate.

8. The composition of claim 7 wherein (a) is a copolymer of acrylamide and sodium acrylate having from about 10 to about 70 mole % sodium acrylate.

* * * * *